United States Patent
Hirayama et al.

(10) Patent No.: US 6,461,512 B1
(45) Date of Patent: Oct. 8, 2002

(54) METHOD OF DISINFECTING A DEIONIZED WATER PRODUCING APPARATUS AND METHOD OF PRODUCING DEIONIZED WATER

(75) Inventors: Junya Hirayama, Tokyo (JP); Shigeaki Sato, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 09/633,841

(22) Filed: Aug. 7, 2000

(30) Foreign Application Priority Data

Aug. 11, 1999 (JP) ............................................ 11-227714

(51) Int. Cl.[7] ........................ B01D 61/00; B01D 63/00; B01D 24/46
(52) U.S. Cl. .................... 210/636; 210/652; 210/195.2; 210/257.2; 210/660; 210/259; 204/524; 204/533
(58) Field of Search ................................. 210/900, 652, 210/195.1, 636, 195.2, 257.2, 259, 660, 638; 204/524, 533

(56) References Cited

U.S. PATENT DOCUMENTS

| 4,956,071 A | * | 9/1990 | Guiffrida et al. |
| 5,316,637 A | * | 5/1994 | Ganzi et al. |
| 5,725,776 A | * | 3/1998 | Kenley et al. |
| 5,833,846 A | * | 11/1998 | Tanabe et al. |
| 5,868,915 A | * | 2/1999 | Ganzi et al. |

* cited by examiner

Primary Examiner—Ana Fortuna
(74) Attorney, Agent, or Firm—Kanesaka & Takeuchi

(57) ABSTRACT

A deionized water producing apparatus includes a pretreatment apparatus having a reverse osmosis apparatus, and an electrodeionization apparatus having a diluting compartment filled with an ion exchanger. In order to disinfect the deionized water producing apparatus, hot water of higher than 80° C. is flown through the pretreatment apparatus, and hot water of higher than 60° C. is flown through the electrodeionization apparatus. Hot water flowing thorough the electrodeionization apparatus is gradually heated at a rate of 0.1–10° C./min.

6 Claims, 3 Drawing Sheets

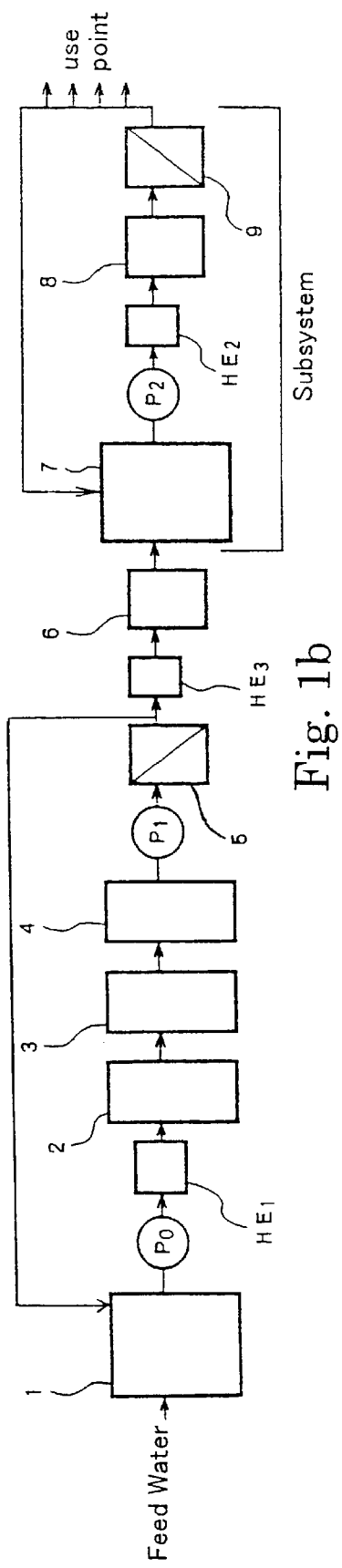
Fig. 1a
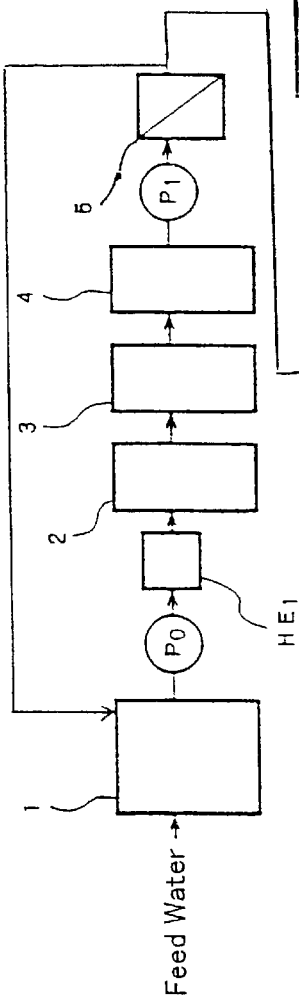
Fig. 1b
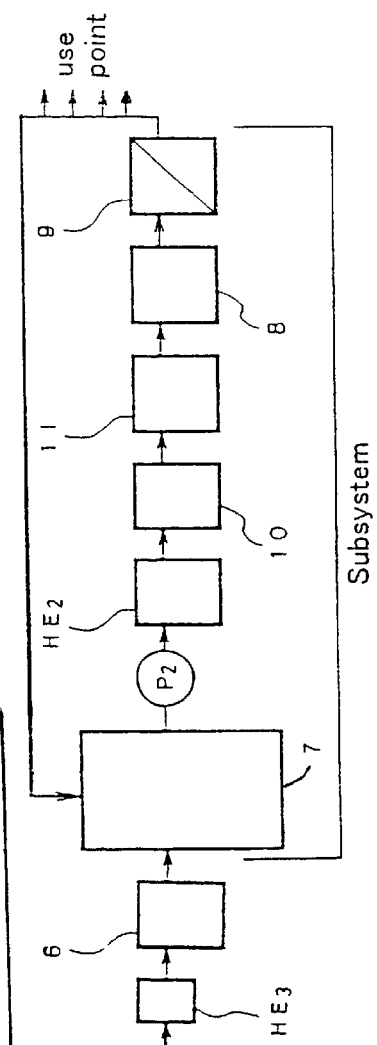

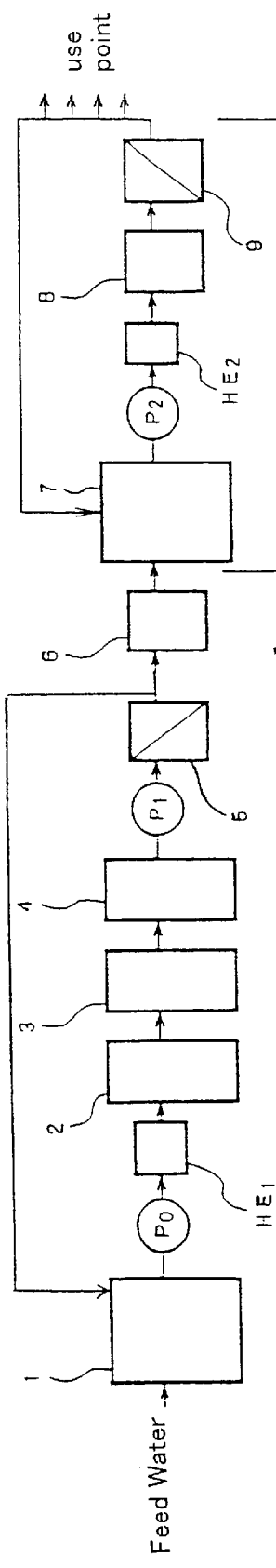
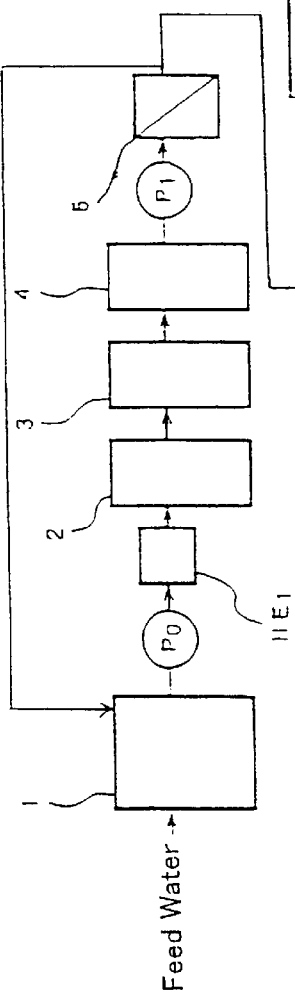
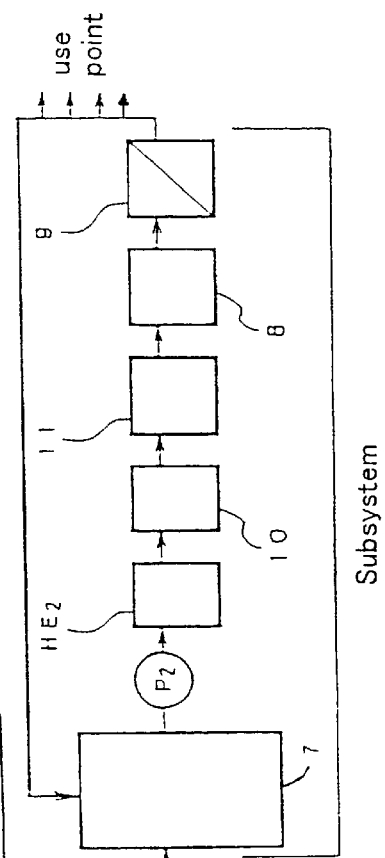
Fig. 2a
Fig. 2b

METHOD OF DISINFECTING A DEIONIZED WATER PRODUCING APPARATUS AND METHOD OF PRODUCING DEIONIZED WATER

FIELD OF THE INVENTION

The present invention relates to a method of disinfecting deionized water producing apparatus and a method of producing deionized water with using the electrodejonization apparatus disinfected by disinfecting method.

BACKGROUND OF THE INVENTION

A conventional system for producing purified water which is employed in fields of the pharmaceutical manufacturing industry, the semiconductor manufacturing industry and the like is shown FIGS. 2a and 2b.

FIG. 2a is a system diagram illustrating a system for producing deionized water employed in the field of the pharmaceutical manufacturing industry, in which raw water is treated with an activated carbon (AC) column or tower 2, a safety filter 3 and a membrane degassing apparatus 4 by way of a tank 1, a pump P0 and a heat exchanger HE1, and then the water is pressured by a pump P1 and treated with a reverse osmosis membrane (RO) apparatus 5 and an electrodeionization apparatus 6. After that, the water is treated with a subsystem comprising an ultraviolet (UV) disinfecting apparatus 8 and an ultra filtration (UF) membrane apparatus 9 by way of a tank 7, a pump P2 and a heat exchanger HE2, and finally the water is transported to a use point.

FIG. 2b is a system diagram illustrating a system for producing the deionized water employed in the field of the semiconductor manufacturing industry. As shown in FIG. 2b, the raw water such as city water and well water is treated with the AC column 2, the safety filter 3 and the membrane degassing apparatus 4 by way of the tank 1, the pump $P_0$ and the heat exchanger HE, and then pressurized by the pump $P_1$. After that, the water is treated with the RO membrane apparatus 5 and the electrodeionization apparatus 6.

Furthermore, the water is treated with a subsystem comprising a low-pressure UV oxidizing apparatus 10, a mixed-bed ion exchange apparatus 11, the UV disinfecting apparatus 8 and the UF membrane apparatus 9, and then transported to the use point.

The deionized water producing apparatus is disinfected when the operation of the apparatus is commenced or periodically as follows.

Above equipments previous to the electrodeionization apparatus 6 are disinfected with heated water or agents. For example, when the system shown in FIG. 2a is disinfected with the heated water, the water in the tank 1 is heated to 80 to 90° C. with the heat exchanger $HE_1$, and then the hot water is let through the AC column 2, the safety filter 3 and the membrane degassing apparatus 4, after that, the water is pressurized with pump $P_1$ to let the water through the RO membrane apparatus 5. The reject water of the RO membrane apparatus is drained or fed back to the tank1. The permeated water of the RO membrane apparatus is drained or circulated to the tank 1.

After that, the subsystem is disinfected with heated water or agents. For example, disinfection is made in such a manner that the water in the tank 7 is heated to 80 to 90° C. with the heat exchanger $HE_2$ and, then, is let through the UV disinfecting apparatus 8 and the UF membrane apparatus. The reject water and the permeated water of the UF membrane apparatus 9 are drained. Furthermore, piping from the usepoint to the tank 7 is disinfected with steam.

The electrodeionization apparatus 6 is disinfected by using a germicide such as agent like $H_2O_2$. However, the efficiency of disinfection is insufficient. In case the disinfecting with agents is periodically made, it is necessary to securely manage the prevention against retention of the agents in the equipments and the piping.

As disclosed above the conventional systems for producing deionized water shown in FIGS. 2a and 2b are disinfected insufficiently and bacteria are present in product water of the electrodeionization apparatus, so that the succeeding subsystem is polluted with the bacteria within a short time. Since the bacteria are not completely removed even with the UV disinfecting apparatus, the bacteria proliferate in the system as the time elapses. That is, an ion exchanger resin or an ion exchange membrane is disinfected insufficiently, so that the bacteria are unusually present on the order of $10^2$ to $10^7$ per 100 cc in the product water. The number of bacteria increases as the operational time elapses to degrade the quality of the product water.

OBJECT AND SUMMARY OF THE INVENTION

It is an object of the present invention to solve aforementioned conventional problems and to provide a method of disinfecting deionized water producing apparatus and a method of producing deionized water which prevents bacteria proliferation in the electrodeionization and provides deionized water of high quality.

A method of the invention is for disinfecting deionized water producing apparatus which has a preceding or pretreatment apparatus including a reverse osmosis (RO) apparatus, and an electrodeionization apparatus having a diluting compartment filled with an ion exchanger. According to the method, the preceding apparatus is disinfected by flowing hot water of higher than 80° C. therethrough, and the electrodeionization apparatus is disinfected by flowing hot water of higher than 60° C. therethrough.

The deionized water producing apparatus may be disinfected by the method of the present invention when the apparatus is started to be operated or intermittently during operation thereof, so that the number of bacteria in the deionized water flown out of the electrodeionization apparatus is kept at a low level.

The hot water to be flown into the apparatus for disinfection thereof is preferably heated or cooled at a rate of 0.1–10° C./min in order to prevent deterioration by heat of ion exchange resin and ion exchanging membranes in the electrodeionization apparatus.

According a method of producing deionized water of the present invention, deionized water is prepared by the deionized water producing apparatus which is disinfected according to the disinfecting method of the present invention.

BRIEF DESCRIPTION OF THE DRAWINGS

FIGS. 1a and 1b show electrodeionization apparatus which is used for a method of producing deionized water of the present invention;

A FIGS. 2a and 2b are flow diagrams of conventional electrodeionization apparatuses.

DETAILED DESCRIPTION OF THE PREFERRED EMBODIMENTS

Figure 3:
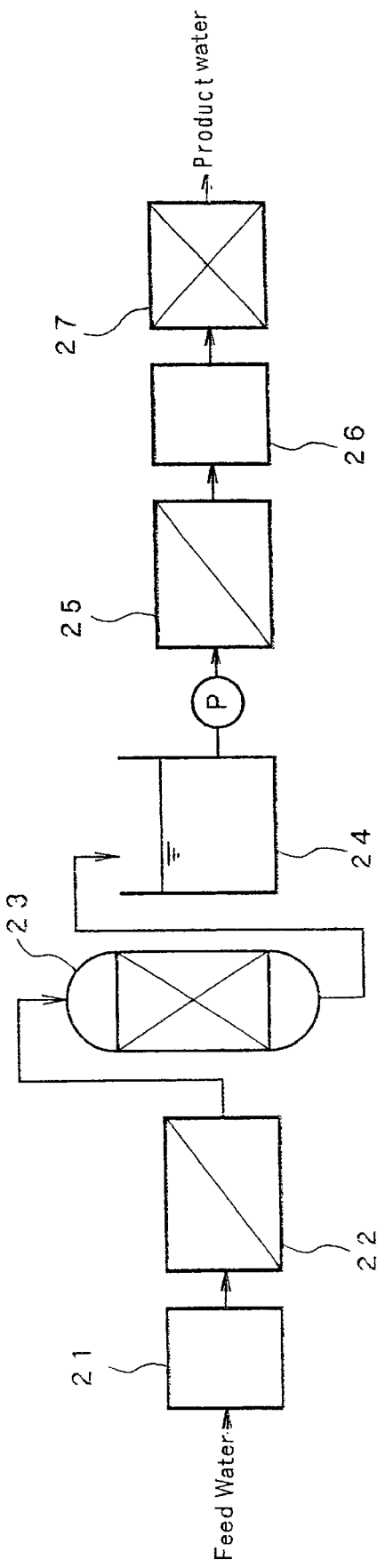
FIG. 3 is a flow diagram of an electrodeionization apparatus employed by an example of the invention.

The invention will be described referring to the attached drawings. FIGS. 1a and 1b show electrodeionization apparatuses employed by the method of the invention, where the same reference numerals denote the same member as in FIGS. 2a and 2b. The apparatuses of FIGS. 1a and 1b have the same constructions as in FIGS. 2a and 2b except that the heat exchangers $HE_3$ are provided preceding the electrodeionization apparatuses 6.

The preceding or pretreatment apparatus including the RO apparatus is disinfected by flowing hot water of higher than 80° C. therethrough, and the electrodeionization apparatus is disinfected by flowing hot water of higher than 60° C. therethrough. After the apparatuses and members preceding the electrodeionization apparatus are disinfected by the hot water of higher than 80° C., water of ambient temperature is flown through the preceding apparatus, and the treated water flown out of the preceding apparatus is heated up to 60° C. or higher and fed to the electrodeionization apparatus for disinfecting thereof.

For example in FIGS. 1a and 1b, raw water in the tank 1 is heated by the heat exchanger $HE_1$ up to 80° C. or higher, preferably 80 to 90° C. and the heated hot water is flown through the RO apparatus 5 for disinfection thereof.

After disinfecting the RO apparatus 5, water of ambient temperature in the tank 1 is fed to the preceding apparatus and permeated water taken out of the RO apparatus 5 is heated up to 60° C. or higher to be fed to the electrodeionization apparatus 6.

The apparatus 6 has ion exchangers including cation exchange resin and anion exchange resin, cation exchange membranes, anion exchange membranes, an anode plate and a cathode plate, and all of which are disinfected by the hot water.

The hot water disinfecting the electrodeionization apparatus is preferable to have equal to or higher quality than that of permeated water of a RO apparatus.

Accordingly in the present invention, after the preceding apparatus including the RO apparatus is first disinfected by the hot water, water of ambient temperature is flown therethrough, and the permeated water is heated and fed to the electrodeionization apparatus for disinfection. The hot water for disinfecting the electrodeionization apparatus should be 60° C. or higher, preferably higher than 70° C. and more preferably higher than 80° C.

The hot water is preferable to flow at a rate of 0.25–1.00 L/min/cell, where "L" is liter, for more than 10 minutes, more preferably more than 15 minutes, and most preferably more than 30 minutes.

When the hot water of 60° C. is flown, it is preferable to be flown for more than 20 minutes, more preferably more than 40 minutes, and most preferably more than 60 minutes.

When the hot water of 80° C. is flown, it is preferable to be flown for more than 10 minutes, more preferably more than 20 minutes, and most preferably more than 40 minutes.

The water fed to the electrodeionization apparatus is unpreferable to be charged from hot to cool or from cool to hot suddenly, since it heats or cools ion exchange membranes to expand or contract so rapidly to cause deterioration thereof. Accordingly, the water fed to the electrodeionization apparatus is preferable to be heated up or cooled down at a rate of 0.1–10° C./min.

After disinfecting the electrodeionization apparatus by the hot water, then the temperature of the hot water fed to the electrodeionization is fallen gradually at a rate of 0.1–10° C./min. down to 40° C. or lower, preferably 35° C. or lower, most preferably to the ambient temperature.

The flown out water of the electrodeionization apparatus which is fed with the hot water may be discarded or returned to the tank 1. Concentrated water flown out of a concentrating compartment of the electrodeionization apparatus may be also discarded or returned to the tank 1.

The water pressure at each inlet of the diluting compartment, the concentrating compartment and the electrode compartment arranged in the electrodeionization apparatus is preferably less than 0.1 MPa and more preferably less than 0.5 MPa in order to prevent deformation or deterioration of the apparatus.

A member of the apparatus such as a pipe or the tank which contacts the hot water is preferably of heat resistant material such as stainless.

Although the apparatuses shown in FIGS. 1a and 1b relate to the purified water producing systems for the pharmaceutical manufacturing industry and ultra-pure water producing system for the semiconductor manufacturing industry, the method of the present invention is not limitative thereto but capable of being applied to other various fields.

EXAMPLES

Example 1

City water of Atsugi, Kanagawa Japan was treated at a rate of 0.5 m³/hr by the apparatus of FIG. 3.

In this apparatus, feed water of the above city water was flown through the heat exchanger 21, treated by the microfiltration (MF) apparatus 22 and the activated carbon (AC) tower 23, and fed from the tank 24 to the RO apparatus 25 via the pump P. Permeated water from the RO apparatus 25 was heat-exchanged by the heat exchanger 26 and treated by the electrodeionization apparatus 27. The particulars of the apparatuses are as follows:

MF apparatus 22: "Kuriequrun" of Kurita Water Industries Ltd.

AC tower 23: "Kurare Coal KW" of Kurare Co., Ltd.

RO apparatus 27: "SG 4040CZH of Desari Co,. Ltd. having a diameter of 4 inches Electrodeionization apparatus 27: "CDI P—10 of U.S. Filter/Ionpure, Inc. having 10 cells; mixture of anion exchanger and cation exchanger being filled in both diluting compartment and concentrating compartment:

The deionized water apparatus 27 is of the type where feed water at an ambient temperature is flown at a rate of 0.83 L/min/cell.

First step;

In the first step, hot water of 80° C. was flown from the heat exchanger to the RO apparatus via the apparatus 22, the tower 23, the tank 24 and the pump so that they were disinfected.

Second step:

After the first step, water of ambient temperature was flown through the heat exchanger, the apparatus 22, the tower 23, the tank 24, the pump P, the apparatus 25, the heat exchanger 26 and the electrodeionization 27. The inlet pressure of the apparatus 27 was adjusted to 0.05 Mpa. Then the water was heated by the heat exchanger 26 at a rate of 1–1.5° C./min for about 40 minutes such that the temperature of the water flown out from the diluting compartment became at 60° C. The hot water was flown through the electrodeionization apparatus 27 for one hour, and thereafeter the hot water was started to be cooled down at a rate of 1–1.5° C./min. The hot water was cooled down until the temperature at the outlet of the diluting compartment became to 35° C. The electrodeionization apparatus 27 was not flown with electric current during the second step.

Third step:

After the second step, the raw water was fed to the apparatus of FIG. 3, and the permeated water of the RO apparatus 25 was fed to the electrodeionization apparatus 27 continuously for 9 days. The number of bacteria in the permeated water of the RO apparatus 25 and the deionized water flown out of the electrodeionization 27 was measured, and the results thereof are shown in Table 1.

The uppermost line in Table 1 shows the number of bacteria in the water before disinfecting the apparatus.

TABLE 1

| Days after disinfection | number of bacteria per 1 cc in the permeated water | number of bacteria per 1 cc in the deionized water |
| --- | --- | --- |
| before disinfection | 75 | 300 |
| after 1 day | 0.00 | 0.06 |
| after 3 days | 0.00 | 0.11 |
| after 6 days | 0.06 | not detected |
| after 9 days | 0.01 | 0.05 |

As clearly shown in Table 1, the number of bacteria is kept very low for a long period when the apparatus such as the MS apparatus and the RO apparatus preceding the electrodeionization is disinfected with hot water of 80° C. and the electrodeionization is disinfected with hot water of 60° C.

As described above, the electrodeionization apparatus is prevented from bacteria proliferating therein so that the number of bacteria flowing out of the electrodeionization apparatus is kept low, according to the present invention.

Accordingly a UV disinfecting apparatus succeeding the electrodeionization apparatus can be deleted, and times of disinfecting the subsystem are reduced, so that deionized water of high quality is produced at a very low cost.

What is claimed is:

1. A method of disinfecting a deionized water producing apparatus including a pretreatment apparatus having a reverse osmosis apparatus, and an electrodeionization apparatus having a diluting compartment filled with an ion exchanger, said method comprising:

flowing hot water of higher than 80° C. through the pretreatment apparatus to disinfect the pretreatment apparatus, and flowing hot water of higher than 60° C. through the electrodeionization apparatus to disinfect the electrodeionization apparatus, said hot water flowing thorough the electrodeionization apparatus being gradually heated at a rate of 0.1–10° C./min.

2. The method of disinfecting the deionized water producing apparatus as claimed in claim 1, wherein after flowing the hot water higher than 80° C. through the pretreatment apparatus to disinfect the same, water of ambient temperature is flown through the pretreatment apparatus, and the water flowing from the pretreatment apparatus is gradually heated at the rate of 0.1–10° C. to a temperature high than 60° C. while flowing the water through the electrodeionization apparatus for disinfecting the same.

3. The method of disinfecting the deionized water producing apparatus as claimed in claim 2, wherein the temperature of the hot water flowing into the electrodeionization apparatus is reduced at a rate of 0.1–10° C./min after disinfecting the electrodeionization apparatus.

4. The method of disinfecting the deionized water producing apparatus as claimed in claim 3, wherein the reverse osmosis apparatus of the pretreatment apparatus is at first disinfected by flowing the hot water higher than 80° C. therethrough, and then, the ion exchanger of the electrodeionization apparatus is disinfected by heating the water passing through the pretreatment apparatus to the temperature high than 60° C.

5. The method of disinfecting the deionized water producing apparatus as claimed in claim 1, wherein said hot water flows through the electrodeionization apparatus at a rate of 0.25–1.00 L/min/cell for more than 10 minutes.

6. A method of producing deionized water comprising:

disinfecting a deionized water producing apparatus including a pretreated apparatus having a reverse osmosis apparatus, and an electrodeionization apparatus having a diluting compartment filled with an ion exchanger by flowing hot water of higher than 80° C. through the pretreatment apparatus to disinfect the pretreatment apparatus, and flowing hot water of higher than 60° C. through the electrodeionization apparatus to disinfect the electrodeionization apparatus, said hot water flowing thorough the electrodeionization apparatus being gradually heated at a rate of 0.1–10° C./min, and flowing water through the disinfected deionized water producing apparatus to thereby produce the deionized water.

* * * * *